UNITED STATES PATENT OFFICE.

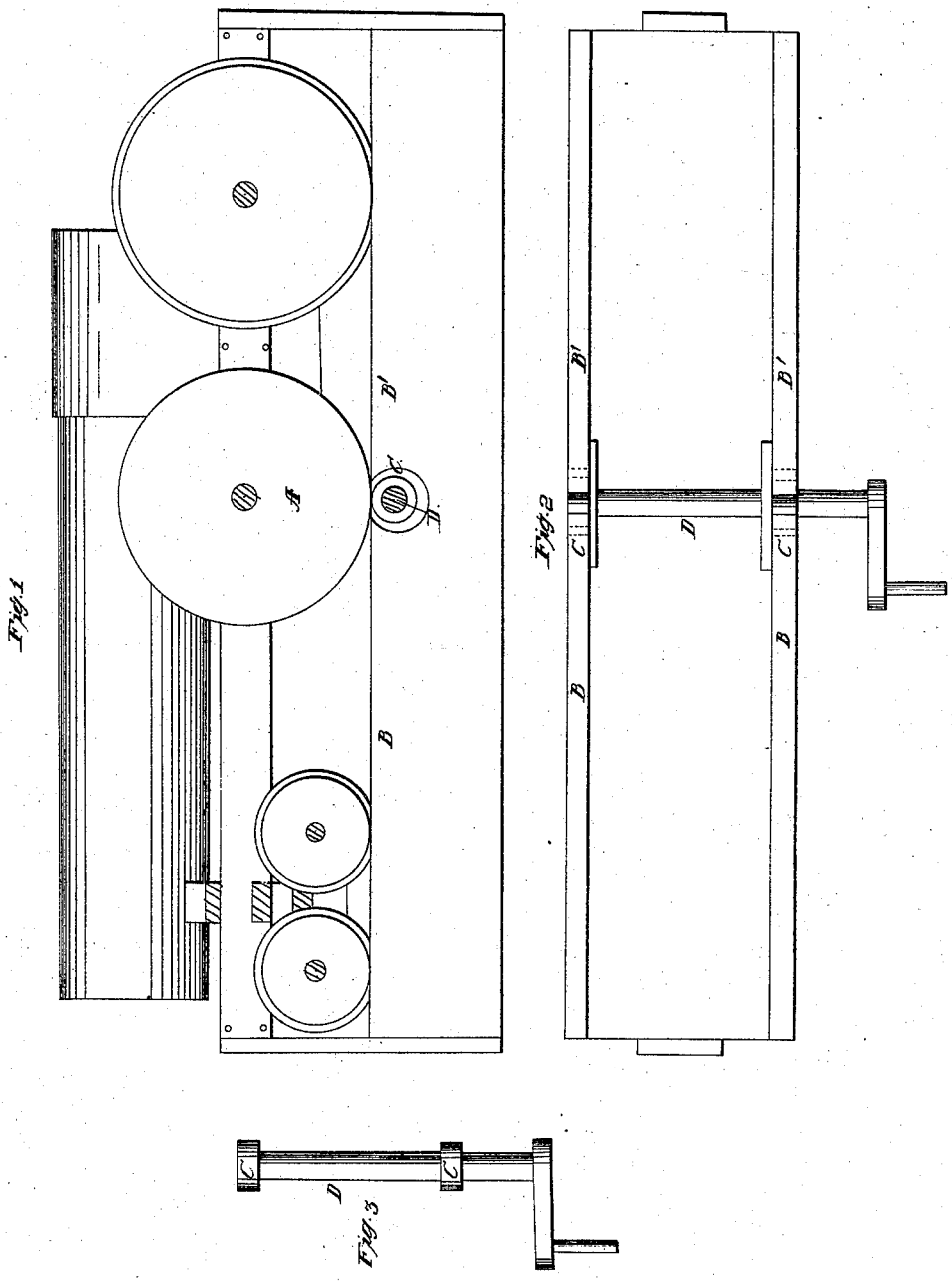

HENRY W. FARLEY, OF EAST BOSTON, MASSACHUSETTS.

MEANS FOR ADJUSTING THE VALVES OF LOCOMOTIVE ENGINES.

Specification of Letters Patent No. 10,857, dated May 2, 1854.

*To all whom it may concern:*

Be it known that I, HENRY W. FARLEY, of East Boston, in the county of Suffolk and State of Massachusetts, have invented a certain new and useful Method of Setting the Valves of Locomotives, of which the following is a full, clear, and exact description, reference being had to the annexed drawings, making part of this specification.

In setting the valves of locomotives it becomes necessary to work the driving wheels at least one entire revolution, and a sufficient length of rail is required in the workshop for the purpose, the engine being moved with bars and levers placed beneath the wheels, or by some other slow and laborious means. This operation is to be repeated whenever the engine is overhauled, or whenever the valve rod connections become so worn as to require setting up. There are many disadvantages attendant upon this method of setting the valves of locomotives: 1st. A considerable space must be devoted to the purpose in the workshop. 2nd. Much time and labor is consumed on account of the manner in which the engine requires to be moved. 3rd. No other work can be done upon the same engine while it is being thus moved about.

To obviate these inconveniences is the object of my present invention which consists in placing a pair of rollers upon a shaft fixed transversely beneath the road-way, the rails being broken away to accommodate the rollers, in such a position that the drivers may be run upon the rollers, the latter being revolved by hand or any other power communicate their motion to the drivers, and the valves may thus be adjusted in a short space of time without requiring the room in the shop heretofore necessary for the purpose and without interrupting any other operations which it may be desirable to perform upon the engine at the same time.

To enable others skilled in the art to make and use my invention I will proceed to describe the method which I have adopted of carrying it out.

Figure 1 is a side elevation of a locomotive with the rollers beneath the drivers. Fig. 2 is a plan of the railway, the locomotive being removed and Fig. 3 a detached view of the shaft and rollers.

A is one of the driving wheels.

B, B′ are two adjacent lengths of rail, which are separated a sufficient distance from each other to admit of the introduction of the rollers C, C. These rollers are made fast to the transverse shaft D and as the latter is turned by hand or by the power which drives the machinery of the shop, the driving wheels and all the parts connected therewith are revolved and the valves are adjusted as before described.

I do not claim making use of the power of the locomotive exerted through rollers placed beneath the rails for the purpose of driving machinery, pumping, sawing or performing other analogous operations, but What I do claim as my invention and desire to secure by Letters Patent is—

The within described method of adjusting the valves of a locomotive engine the drivers being revolved by rollers suitably placed to receive them, which rollers are driven by any suitable power independent of the engine itself.

HENRY W. FARLEY.

Witnesses:
SAM. COOPER,
C. SCHOUBART.